Jan. 26, 1960
H. W. HAPMAN
2,922,513
PAN CONVEYOR
Filed Dec. 29, 1955
4 Sheets-Sheet 2
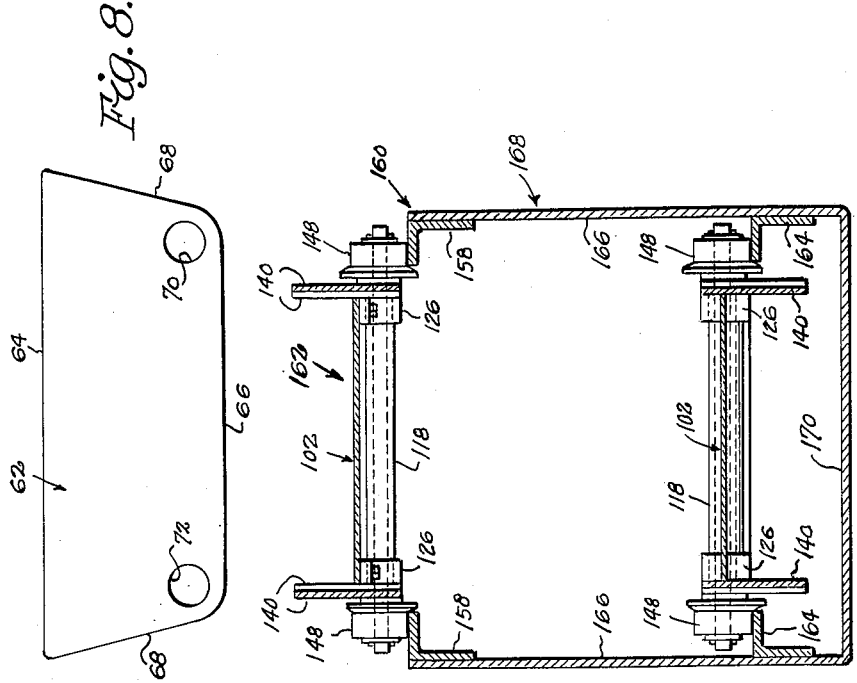
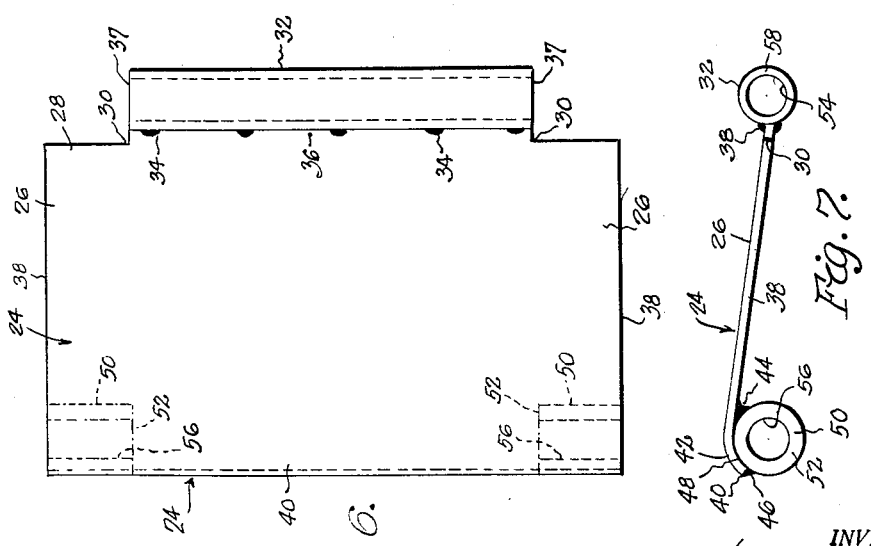
INVENTOR.
Henry W. Hapman
BY Barthel + Bugbee
Attys

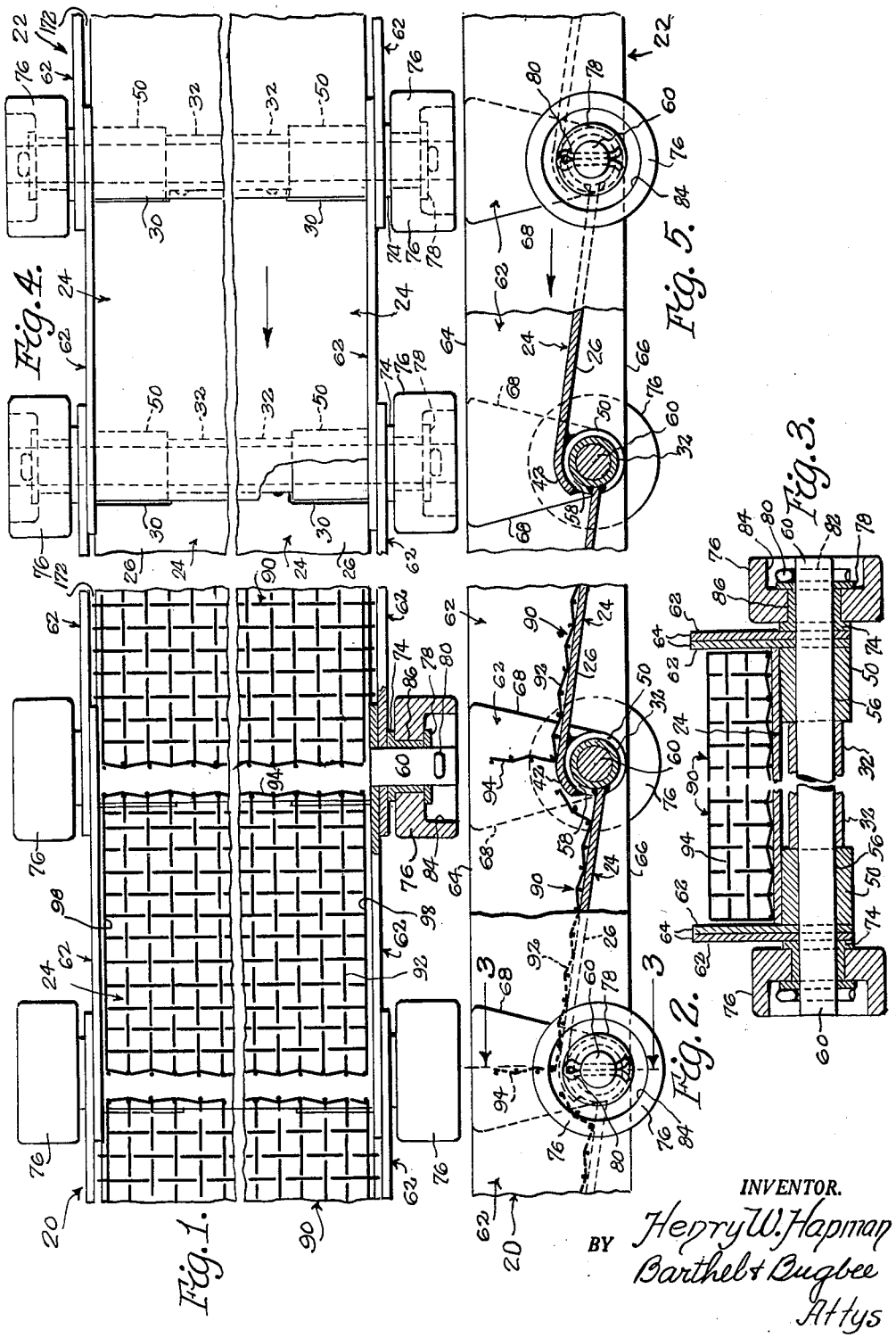

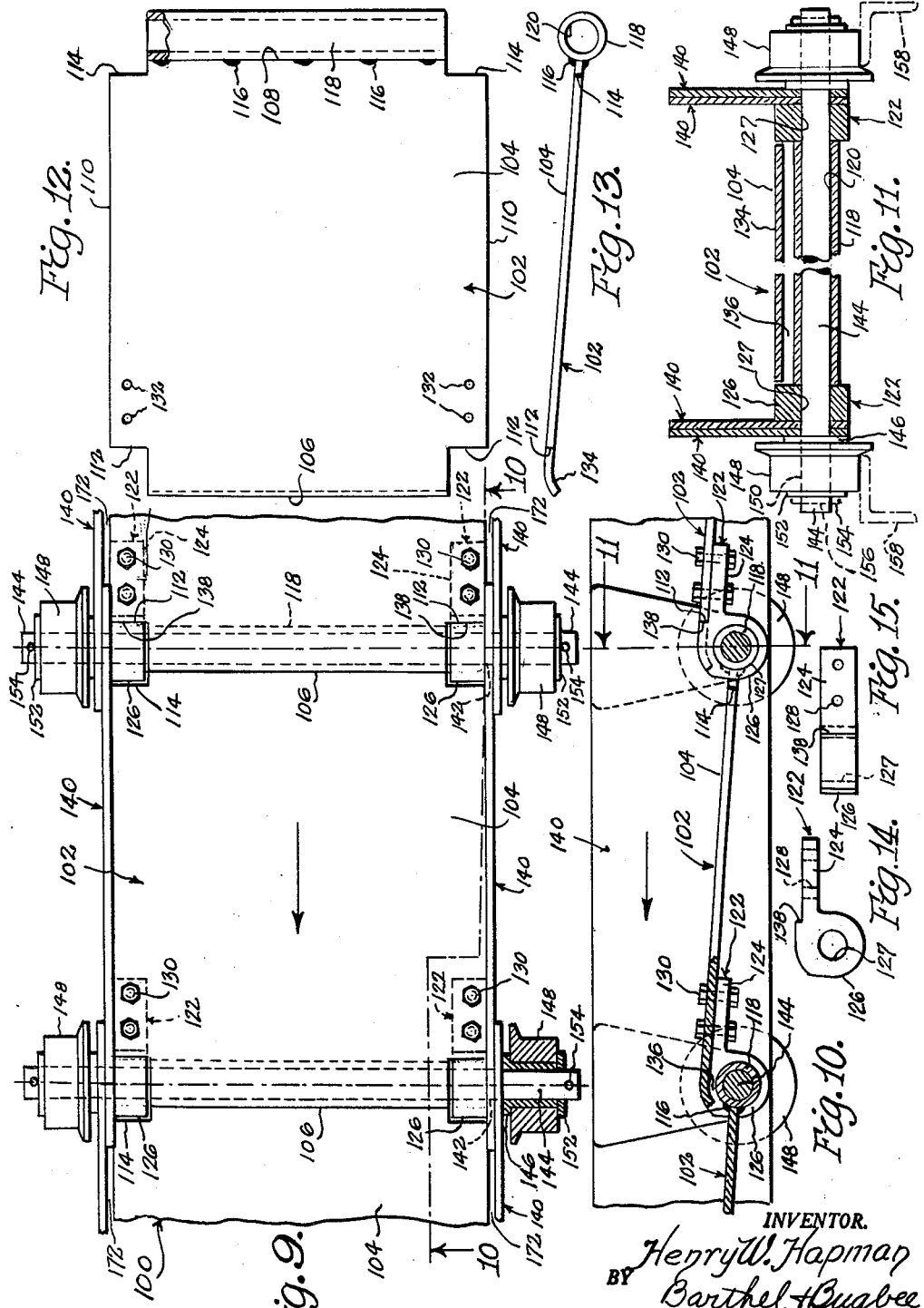

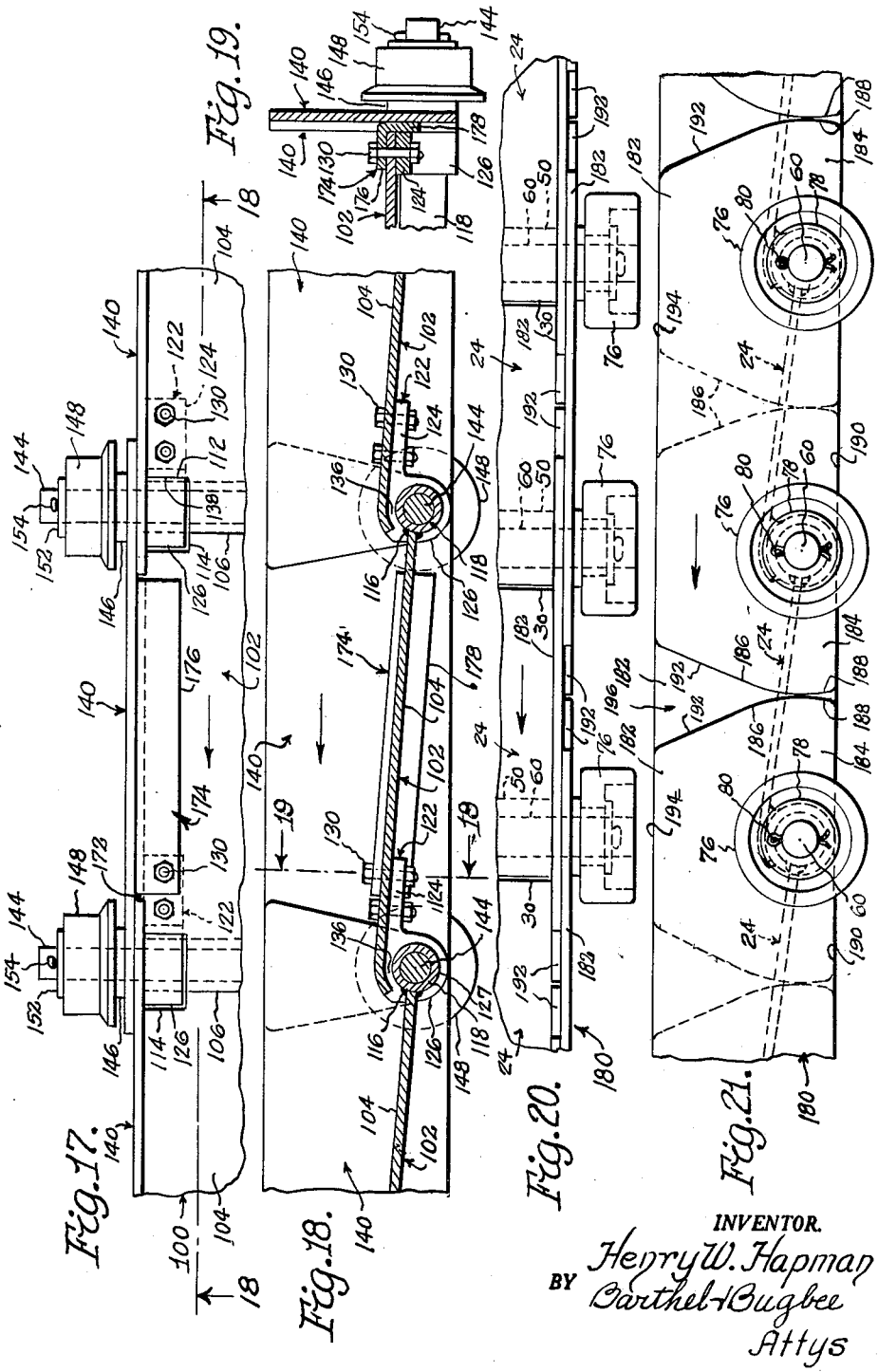

United States Patent Office 2,922,513
Patented Jan. 26, 1960

2,922,513
PAN CONVEYOR

Henry W. Hapman, Hickory Corners, Mich., assignor of forty percent to Hannah Jane Hapman, Hickory Corners, Mich.; Melvin S. Huffaker, Detroit, Mich., and Hannah Jane Hapman, co-executors of said Henry W. Hapman, deceased Application December 29, 1955, Serial No. 556,258

10 Claims. (Cl. 198—196)

This invention relates to endless conveyors and, in particular, to so-called pan conveyors or apron feeders.

Hitherto, so-called endless pan conveyors or apron feeders have been employed in industry for conveying loose bulk material such as coal, gravel, sand, ore, glass cullet, foundry scrap or refuse and other materials of this nature. They have also been used for conveying hot materials that would otherwise injure ordinary belt conveyors, and as they have a stronger construction than ordinary conveyors they have been employed for installations where materials fall on the conveyor from a height with a considerable impact force.

Such prior pan conveyors or apron feeders have consisted substantially of a pair of laterally-spaced endless chains interconnected by shafts or rods carrying flanged wheels or rollers between which are arranged overlapping plates or pans for carrying the material to be conveyed. The chains are driven by sprockets having teeth entering the spaces between the flanged wheels along each side of the pans or plates. So-called skirt plates arranged between the wheels or rollers and the pans extend upward a short distance and slide relatively to one another to reduce edge spillage of materials being conveyed.

Such prior pan conveyors or apron feeders, however, have had several serious defects which have limited their use and made their operation unsatisfactory. In such prior conveyors of this type, particles of the conveyed material entered the cracks between the overlapping and relatively pivoting pans, which have been arranged in closely engaging relationship, with the result that abrasive action and consequent wear occurred as a result of the rubbing of the adjacent plates or pans against the particles of material between them. Moreover, the cost of the two propelling chains increased the cost of the installation and since such chains were of special construction with single links extending from shaft to shaft of each pan or plate, the cost of the conveyor installation was high. Furthermore, if the prior pan conveyor was used for conveying small mechanical parts or articles other than bulk materials, these parts were difficult to feed and convey evenly, particularly where it was desired to maintain a substantially constant rate of feed.

The present invention provides a pan conveyor which eliminates these difficulties and defects of prior conveyors by linking the plates themselves together into an endless chain, thereby eliminating the propelling chains previously required at the ends of the pans or plates, the latter being spaced apart from one another with a constantly-maintained spacing to reduce the abrasive friction and wear previously caused by particles of the conveyed material getting between the sliding plates.

Accordingly, one object of the present invention is to provide an endless pan conveyor wherein propelling chains are eliminated and the pans themselves are linked end-to-end to one another by rods which carry the wheels or rollers which not only serve to support the conveyor by rolling along guide tracks but also serve to drive the conveyor by being engaged directly by sprockets.

Another object is to provide an endless pan conveyor of the foregoing character wherein means is provided for preventing direct sliding contact between the pans or plates and wherein the pans or plates are provided with overlapping ends which are positively prevented from engaging one another by being constantly maintained at a predetermined spacing which greatly reduces the abrasive effect and wear of particles getting between the plates, as well as preventing a large part of such penetration of the conveyed material.

Another object is to provide an endless pan conveyor of the foregoing character wherein the pans are easily and inexpensively manufactured from standard shafting, sheet metal, and pipe by simple cutting and welding operations, thereby still further reducing the cost of the conveyor and consequently reducing the price to the ultimate user.

Another object is to provide an endless pan conveyor of the foregoing character wherein the pipe sections welded to opposite ends of the pans for pivotally receiving the wheel shafts also serve as propelling bars for urging the conveyed material onward, thereby eliminating the slots previously required for this purpose.

Another object is to provide an endless pan conveyor of the foregoing character wherein the pans are optionally provided with mesh baskets to assist in the conveying of particles or pieces larger than the size of the mesh, as well as to prevent sliding back of the conveyed material along an inclined course of the conveyor and also to break up the capillary attraction of the oil-coated flat articles which otherwise cause them to adhere to the flat surfaces of the pans and interfere with their being discharged at the desired location.

Another object is to provide a modified endless pan conveyor wherein each pan has a section of pipe welded to one end and a pair of laterally-spaced bearing brackets bolted or otherwise secured to the other end thereof for receiving the respective wheel or roller shafts by which the conveyor is supported upon its guide tracks and driven by its drive sprocket.

Another object is to provide an endless pan conveyor as set forth in the object immediately preceding, wherein the sides of the pans are provided with overlapping outer and inner skirt boards to prevent spillage of material, and wherein skirt space fillers are provided to prevent loss of conveyed material through the gaps between the outer skirt boards and the longitudinally-spaced ends of the inner skirt boards.

Another object is to provide a further modified endless pan conveyor of the foregoing character wherein the sides of the pans are provided with overlapping outer and inner skirt boards to prevent spillage of material, and wherein the outer skirt boards are extended at their ends and shaped arcuately to have rolling proximity to one another during pivoting thereof.

Another object is to provide an enclosed endless pan conveyor for wet material or articles or for articles which have been coated with a cutting fluid or coolant, the conveyor enabling this liquid to be reclaimed without the loss of liquid which otherwise occurs in an open conveyor.

Other objects and advantages of the invention will become apparent during the course of the following description of the accompanying drawings, wherein:

Figure 1 is a top plan view partly in section of a portion of an endless pan conveyor equipped with mesh brackets, according to one form of the invention;

Figure 2 is a side elevation, partly in vertical section, of the pan conveyor portion shown in Figure 1;

Figure 3 is a vertical cross-section through one of the pans, taken along the line 3—3 in Figure 2;

Figure 4 is a top plan view similar to Figure 1, with the mesh baskets omitted;

Figure 5 is a side elevation, partly in section, of the endless pan conveyor portion shown in Figure 4;

Figure 6 is a top plan view of one of the conveyor pans, removed from the conveyor;

Figure 7 is a side elevation of the conveyor pan shown in Figure 6;

Figure 8 is a side elevation of a skirt plate used at the opposite edges or sides of the conveyor pan of Figures 6 and 7;

Figure 9 is a top plan view partly in section of a portion of a slightly modified endless pan conveyor;

Figure 10 is a side elevation, partly in vertical section, of the conveyor portion shown in Figure 9, taken along the line 10—10 therein;

Figure 11 is a vertical cross-section through one of the pans, taken along the line 11—11 in Figure 10;

Figure 12 is a top plan view of one of the pans of the conveyor of Figures 9 and 10 removed from the conveyor and with its bearing brackets removed;

Figure 13 is a side elevation of the conveyor pan shown in Figure 12;

Figure 14 is a side elevation of one of the bearing brackets used with the pan of Figures 12 and 13;

Figure 15 is a top plan view of the bearing bracket shown in Figure 14;

Figure 16 is a cross-section through an enclosed pan conveyor installation for conveying liquid-coated or liquid-carrying articles or material, and enabling reclaiming of the liquid;

Figure 17 is a fragmentary top plan view of the endless pan conveyor of Figures 9 to 15 inclusive further equipped with edge gap fillers to prevent loss of conveyed materials through the gaps between the pan edges and the outer skirt boards;

Figure 18 is a longitudinal section taken along the line 18—18 in Figure 17;

Figure 19 is a vertical cross-section taken along the line 19—19 in Figure 18;

Figure 20 is a fragmentary top plan view of a still further modified endless pan conveyor equipped with overlapping outer and inner skirt boards having extended ends of arcuate shape so as to maintain rolling proximity to one another during pivoting thereof; and Figure 21 is a side elevation of the modified conveyor shown in Figure 20.

Referring to the drawings in detail, Figures 1 to 3 inclusive show a short portion of an endless pan conveyor, generally designated 20, requiring no separate propelling chains at its opposite sides or edges. The endless pan conveyor, generally designated 22, shown in Figures 4 and 5 is the same as that shown in Figures 1 to 3 inclusive with the exception of the fact that, as explained below, mesh baskets provided in the conveyor 20 have been omitted in the conveyor 22, hence the same reference numerals and a common description will suffice for both. Each of the conveyors 20 and 22 contains pans 24 composed of a sheet metal plate 26 of approximately rectangular outline with one end 28 notched out as at 30 and a piece of standard pipe 32 welded as at 34 to the short remaining end portion 36 and having opposite ends 37. The opposite side edges 38 of the plate 26 are substantially parallel to one another and the end 40 opposite the end 28 is bent into arcuate form as at 42 (Figure 7). Welded as at 44 and 46 in the partially cylindrical recess 48 provided by the bent portion 42 are two short lengths of standard so-called double-extra-heavy pipe 50 with their outer ends 52 positioned substantially flush with the edges 38.

The pipe lengths 50 added to the pipe lengths 32 substantially equal the width of the plate 26, the notched out portions 30 being of size and shape sufficient to receive the short pipe lengths 50 when the conveyor is assembled, as explained below. The pipe lengths 32 and 50 are provided with the usual bores 54 and 56, these being of the same internal diameters. Due to the fact that the pipe lengths 32 are of smaller outside diameters than the pipe lengths 50, because of the thicker side walls of the latter, the pipe length 32 mounted on a common shaft between a pair of the pipe lengths 50 does not come into contact with the curved portion 42 of the plate 26, but is spaced away from it by a gap 58 (Figures 2 and 5) equal in width to the difference in wall thicknesses between the pipe lengths 32 and 50. As a consequence, there is no direct engagement between the successive pans 24 except at the ends 52 and 37 of their short and long pipe lengths 50 and 32 respectively. For flexibility of operation and free running of the conveyor, there is of course a slight clearance between the ends 37 of the pipe length 32 of one pan 24 and the inner ends 52 of the short pipe lengths 50 of the next adjacent pan 24.

Extending through the aligned bores 54 and 56 of the pipe lengths 32 and 50 respectively in the assembled condition of the conveyor 20 or 22 are shafts or axles 60 (Figure 3) of considerably greater length than the widths of the plates 26 between their parallel edges 38. Mounted on the shafts 60 are slidably-engageable outer and inner skirt plates 62 (Figures 1, 3 and 8) of trapezoidal outline with substantially parallel upper and lower edges 64 and 66 of different lengths and oppositely-inclined end edges 68 adapted to overlap one another while the conveyor is passing around a sprocket, such as the drive sprocket or the supporting or idler sprocket (not shown). The skirt plates 62 are of slightly greater lengths than the hand plates 26 and have holes 70 and 72 respectively coaxial with the bores 54 and 56 of the inner and outer pipe lengths 32 and 50 respectively, for receiving the outer ends of the shafts 60. Immediately outwardly of the skirt plates 62, the shaft 60 receives flanged bearing bushings 74 on which wheels or rollers 76 are rotatably mounted and held in position by washers 78 and cotter pins or other fasteners 80 inserted through transverse holes 82 near the ends of the shafts 60 (Figure 3). The wheels or rollers 76 are provided with recesses 84 for housing the washers 78 and fasteners 80, and are bored as at 86 to receive the bearing bushings 74.

The endless pan conveyor 20 is additionally provided with mesh baskets or inserts, generally designated 90, not found in the pan conveyor 22 and, as previously stated, used to facilitate the conveying of loose parts or parts which have liquid coatings thereon which tend to cause them to adhere by capillary attraction to the surface of the pan 24. The baskets 90 consist of lengths of wire mesh material slightly greater than the lengths of the pans 24 so that they are provided with a bottom portion 92 and opposite upturned end portions 94 and 96 respectively (Figure 2). The opposite edges 98 of the baskets 90 are preferably wedged against the skirt plates 62 which, as shown in Figures 1 and 4, are arranged in alternate inner and outer overlapping positions.

The endless pan conveyor 20 or 22 is mounted at the opposite ends of its run upon conventional sprockets (not shown), the teeth of which engage between the wheels 76 to move them onward as the sprockets rotate. The mounting of the conveyor will be discussed below in connection with the description of Figure 16, which shows a slightly modified form of endless pan conveyor arrangement in a housing and with guide rails similar to those employed for the endless pan conveyors 20 or 22.

The modified endless pan conveyor, generally designated 100, shown in Figures 9 to 15 inclusive is intended for heavier duty work than the endless pan conveyors 20 or 22 of Figures 1 to 5 inclusive. As before, each pan, generally designated 102, has a bottom or conveyor plate 104 (Figure 12) of sheet material, such as sheet steel, with the corners at its opposite ends 106 and 108 and its opposite side edges 110 notched out as at 112 and 114 respectively. Welded or otherwise secured as as 116 to the edge 108 is a pipe length 118 having a shaft bore 120. Secured to the plate 104 near the opposite end 106 are bearing brackets, generally designated 122 (Figures 14 and 15). Each bearing bracket 122 consists of an arm 124 carrying an integral offset bearing bushing 126 on one end thereof and drilled as at 128 to receive bolts 130 likewise passing through aligned holes 132 in the plate 104. The bearing bushing 126 has a bearing bore 127 therein of substantially the same diameter as the outer diameter of a shaft or axle 144, as described more fully below. The holes 132 are so located that the bearing bushing 126 extends downwardly into its respective notch 112 (Figures 9, 11 and 12) and pivotally receives the end portions of the axle 144 which overhang the notches 114 into which a portion of the bearing bracket bushing 126 extends (Figures 9 to 11 inclusive). The plate 104 of the pan 102 is arcuate bent as at 134 where it overhangs the adjacent pipe section 118, but is spaced away from the latter by means of a clearance or gap 136 (Figure 11) which is regulated by the dimensions of the bearing brackets 122. Each bearing bracket 122 has a recess 138 into which the forward edge of the notch 112 of the plate 104 is seated (Figure 10).

As in the case of the endless pan conveyors 20 and 22, the endless pan conveyor 100 is provided with alternately arranged overlapping outer and inner skirt plates 140 similar in shape and arrangement to the skirt plates 62 shown in Figure 8 and similarly bored as at 142 to receive the shafts or axles 144 which pass through the bores 127 in the bearing bushings 126 of the bearing brackets 122 and through the bore 120 of each pipe section 118. As shown in Figure 11, in the assembled condition of the pan conveyor 100, the dimensions are such that the ends of each pipe section 118 fit in between the inner ends of the pair of bearing brackets 122 on the next adjacent pan 102. The outer ends of each shaft 144 carry flanged bearing bushings 146 upon which flanged wheels or rollers 148 are rotatably mounted, with bores 150 receiving the bearing bushings 146 (Figure 11). The wheels 148 are held in position by washers 152 and cotter pins or other fasteners 154, the latter being inserted in transverse holes 156 passing through the shaft 144 near the outer ends thereof.

The endless pan conveyors 20, 22 and 100 are supported in any suitable way upon a pair of sprockets (not shown) at one end of a suporting framework and a pair of drive sprockets (not shown) at the other end of the conveyor course. The drive sprockets and supporting sprockets are conventional and their details form no part of the present invention. It is sufficient to say that the teeth of the sprocket enter the spaces between the wheels or rollers 76 (Figures 1 to 5 inclusive) or 148 (Figures 9 to 11 inclusive), with a pair of the teeth ordinarily accommodated between adjacent wheels or rollers 76 or 148, the trough between adjacent teeth being shaped to receive the wheels or rollers 76 or 148.

In the operation of any of the endless pan conveyors 20, 22 or 100, power is applied from a motor or other prime mover to the drive sprockets to rotate the drive sprockets, consequently causing the pan conveyor to travel in an endless orbital path, guide rails being provided for the upper and lower courses of the conveyor between the supporting sprockets and the drive sprockets, such as the angle rails 158 shown in dotted lines in Figure 11. This structure is likewise conventional and beyond the scope of the present invention. As the pans 24 or 102 travel in their orbital paths, they serve as their own drive chains through their interlinked pivotal connections at their respective shafts or axles 60 or 144. As the pans pivot relatively to one another in passing around the sprockets, the skirt plates 62 or 140 slide relatively to one another in their overlapping relationship, their trapezoidal shape continuing the overlap even though the pans are tilted at considerable angles to one another, thereby preventing spillage of the conveyed materials or articles over the side edges 38 or 110 of the pans 24 or 102 respectively.

The modified endless pan conveyor installation, generally designated 160, of Figure 16 is for the purpose of conveying wet material or articles, or those from which it is desired to reclaim the adherent liquid. The endless pan conveyor 162 with which the installation 160 is equiped may be any one of the conveyors 20 (Figure 1), 22 (Figure 4) or 100 (Figure 9), the conveyor 100 being shown for purposes of illustration. In addition to the upper angle guide rails 158 also shown in Figure 11, the lower angle guide rails 164 are provided, both sets of guide rails being bloted, welded or otherwise secured to the side walls 166 of a conveyor supporting structure, generally designated 168, having a bottom wall 170 interconnecting the side walls 166. While the side walls 166 are shown as integral with the bottom walls 170, it will be evident that these walls may consist of separate sheets of steel or other suitable material welded to one another along their side edges.

In the operation of the endless pan conveyor installation 160 of Figure 16, the conveyor 162 is supported and driven by conventional paired sprockets (not shown) in the manner previously described above, causing the conveyor 162 to move in an endless orbital path along the upper and lower guide rails 158 and 164 and around the respective sprockets. Material or articles to be conveyed are fed onto one end of the upper course of the conveyor 162 and discharged from the other end thereof, liquid draining from the material or articles being conveyed flowing through the clearance spaces 58 (Figure 2) or 136 (Figure 10), and dropping to the bottom wall 170 of the supporting structure 168 whence it is drawn off by suitable piping (not shown) and thus reclaimed if desired. The side walls 166 serve not only to support the upper and lower guide rails 158 and 164 but also to hold in the liquid dropping from the upper course of the conveyor and prevent spattering thereof.

If the articles being conveyed are of such a nature that they have flat surfaces which the capillary attraction of the liquids causes to adhere to the pans 24 or 102, the conveyor 20 with its mesh baskets 90 is preferably used in place of the plain conveyor 22 or 100 of Figures 4 or 9 respectively. Under conveying conditions, the mesh work of the baskets 90 permits increased draining off of the liquid from the conveyed articles while preventing adhesion of the flat surfaces of the articles to the flat surfaces of the pans by capillary attraction. Furthermore, when loose articles, such as machine parts, are conveyed, the baskets 90 prevent loss of such articles and enhance propulsion thereof, especially when the conveying course of the conveyor is inclined. In the absence of the baskets 90, the pipe sections or lengths 32 or 118 of Figures 6 and 12 respectively additionally serve as propelling slats without the necessity of providing such slats, as in prior conveyors. This is accomplished by welding the sheets 26 or 104 approximately radially to the pipe lengths 32 or 118, rather than tangentially thereto. During the operation of any of the conveyors shown, the positive spacing of the overlapping portions of the pans 24 or 102 by the provision of the positively-maintained clearances 58 or 136 prevents abrasive interaction between such pans and particles of conveyed material caught between them, as in prior pan conveyors.

In any of the endless pan conveyors 20, 22 or 100, elongated narrow gaps 172 of widths equal to the thicknesses of the inner skirt boards 62 or 140 occur between the inner and outer overlapping skirt boards, namely at alternate pans along the conveyor (Figures 1, 4, 9 and 16). In most installations, the conveyed materials or articles are of such size or character that they either will not fall through this gap during operation of the conveyor, or that such losses are too trivial to require prevention. Where, however, it is desired to prevent such losses, gap fillers, generally designated 174 (Figures 17 to 19, inc.) are provided. Each gap filler 174 is in the form of an angle bar having upper and side flanges 176 and 178 respectively perpendicular to one another (Figure 19). The upper flange 176 is drilled at one end to receive one of the bolts 130 for retaining it in position longitudinally, whereas the side flange 178 extends downwardly into the edge gap 172 between the outer and inner skirt boards 62 and 140 at the edge of each pan 24 or 102, substantially filling the gap 172 with sufficient clearance at its opposite ends to permit free pivoting of adjacent pans relative to one another. The gap filler 174 is made from sheet material of such thickness as it will fit into the gap 172 and yet leave a sufficient running clearance for smooth operation. The remainder of the installation shown in Figures 17 to 19 inclusive is similar to that shown in Figures 9 to 15 inclusive and similar parts are accordingly designated with the same reference numerals. The operation is also the same, with the added feature that the side flanges 178 of the gap fillers 174 extend downwardly into and fill the gaps 172 between the ends of the inner skirt boards while permitting relative pivoting between adjacent pans. Loss of material or conveyed articles through the gaps 172 is thereby effectively prevented.

The further modified endless pan conveyor, generally designated 180, shown in Figures 20 and 21 employs overlapping skirt boards 182 applicable to the pans of the conveyors 20, 22 or 100, the construction of the conveyor 22 being selected for purposes of exemplification but not limitation. The pans 24 of the conveyor 180, together with their axles 60 and wheels or rollers 76 and all of the remaining construction except the skirt boards, are the same as those shown in Figures 4 and 5 and accordingly similar parts are designated with the same reference numerals. The endless pan conveyor 180, however, is equipped with overlapping outer and inner skirt boards 182 of similar construction to one another and mounted in a manner similar to that shown for the skirt boards 62 of Figures 3, 4 and 5. The skirt boards 182 have end extensions 184, the end edges 186 of which are partly of arcuate shape and partly straight. The arcuate portions 188 (Figure 21) nearest the bottom edges 190 are shaped to circular arcs having their centers approximately at the centers of their respective axles 60 so that regardless of the relative tilting between adjacent pans 24 on their respective axles 60, the circularly-arcuate edge portions 188 will remain in close rolling proximity to one another regardless of whether the conveyor is passing around a sprocket or whether it is changing direction to ascend an incline, as frequently occurs in actual conveyor installations. The straight portions 192 of the end edges 186 nearest the upper edges 194 of the skirt boards 182, however, are inclined away from one another in adjacent skirt boards 182, so that when the conveyor is travelling upon a level or straight course, so that the upper or lower edges 194 or 190 of the skirt boards 182 are substantially lying in alignment in straight parallel lines, the inclined straight end portions 192 diverge upwardly relatively to one another to define V-shaped gaps 196 which, however, are closed by the overlapping portions of the inner skirt boards or outer skirt boards, whichever is under consideration, as shown in Figure 20.

As a consequence, during relative tilting of successive pans 24 during passage around a sprocket or while changing direction to mount an incline, the adjacent outer or inner skirt boards 182 pivot relatively to one another around their respective axles 60, the arcuate portions 188 being maintained in close rolling proximity to one another while diverging straight portions 192 move closer to one another to narrow the gaps 196. In this manner, the skirt boards 182 automatically fill their own edge gaps without the need for the gap fillers 174 shown in Figures 17 to 19 inclusive. The operation of the conveyor 180 is otherwise the same as that of the conveyor 20, 22 or 100 as described above, hence requires no repetition.

What I claim is:

1. An endless pan conveyor comprising a multiplicity of approximately rectangular conveyor plates disposed end-to-end in an endless orbital path, a long sleeve bearing of shorter length than the width of each plate secured transversely to one end of each plate intermediate the lateral edges thereof, a pair of short sleeve bearings secured transversely to and beneath the other end of each plate in laterally-spaced relationship at a separation substantially equal to the length of the long sleeve bearing, each long sleeve bearing being aligned axially with and disposed between the pair of short sleeve bearings on the next adjacent plate, a pivot shaft extending through each set of the thus-aligned short and long sleeve bearings with its opposite ends projecting laterally therebeyond, and conveyor supporting rollers rotatably mounted on the laterally-projecting ends of said pivot shafts, the short sleeve bearings of each set being of greater external diameters than the long sleeve bearing thereof whereby to space said other end of the plate carrying the short sleeve bearings a predetermined radial clearance distance away from the long sleeve bearing so as to prevent rubbing contact between said long sleeve bearing and said other end of said plate overlapping said long sleeve bearing.

2. An endless pan conveyor according to claim 1, wherein each plate has an end portion thereof extending over said short sleeve bearings whereby to provide a protective skirt for the sleeve bearings therebeneath.

3. An endless pan conveyor according to claim 1, wherein each plate has multiple protrusions projecting from one surface thereof.

4. An endless pan conveyor according to claim 3, wherein a mesh member is secured to one surface of each plate.

5. An endless pan conveyor according to claim 3, wherein a mesh basket is secured to one surface of each plate.

6. An endless pan conveyor according to claim 1, wherein said short sleeve bearings have attachment arms projecting therefrom and secured to their respective plates, and wherein said plates have notches in opposite corners thereof receiving said short sleeve bearings.

7. An endless pan conveyor according to claim 6, wherein the end portion of each plate intermediate said notches is arcuately curved and projects over the portion of the long sleeve bearing therebeneath.

8. An endless pan conveyor according to claim 1, wherein alternating inner and outer sleeve boards are mounted on said pivot shafts with their opposite ends disposed in overlapping relationship, and wherein the ends of certain of said sleeve boards extend into close proximity to one another and have adjacent edge portions of oppositely-curved arcuate shape whereby to facilitate pivoting while maintaining closure between said sleeve boards.

9. An endless pan conveyor according to claim 8, wherein the remaining portions of said sleeve board end portions diverge away from their arcuate portions.

10. An endless pan conveyor comprising a multiplicity of approximately rectangular conveyor plates disposed end-to-end in an endless orbital path, a long sleeve bearing of shorter length than the width of each plate secured to one end of each plate intermediate the lateral edges thereof, a pair of short sleeve bearings secured to and beneath the other end of each plate in laterally-spaced relationship at a separation substantially equal to the length of the long sleeve bearing, each long sleeve bearing being aligned axially with and disposed between the pair of short sleeve bearings on the next adjacent plate, a pivot shaft extending through each set of the thus-aligned short and long sleeve bearings with its opposite ends projecting laterally therebeyond, and conveyor supporting rollers rotatably mounted on the laterally-projecting ends of said pivot shafts, the short sleeve bearings of each set being of greater external diameters than the long sleeve bearing thereof whereby to space said other end of the plate carrying the short sleeve bearings a predetermined radial clearance distance away from the long sleeve bearing so as to prevent rubbing contact between said long sleeve bearing and said other end of said plate overlapping said long sleeve bearing, said other end of each plate carrying each pair of spaced short sleeve bearings being curved arcuately over said long sleeve bearing with a radial clearance space therebetween whereby said other end provides a protective skirt for the long sleeve bearing therebeneath while being positively held out of rubbing contact therewith.

References Cited in the file of this patent

UNITED STATES PATENTS

| | | |
|---|---|---|
| 483,475 | Pollock | Sept. 27, 1892 |
| 848,236 | Ginaca | Mar. 26, 1907 |
| 1,224,188 | Malm | May 1, 1917 |
| 1,672,730 | Proctor | June 5, 1928 |
| 2,725,975 | Franz | Dec. 6, 1955 |